April 30, 1935.   P. J. McINTYRE   1,999,818
METHOD OF FORMING TUBING
Filed Jan. 22, 1931
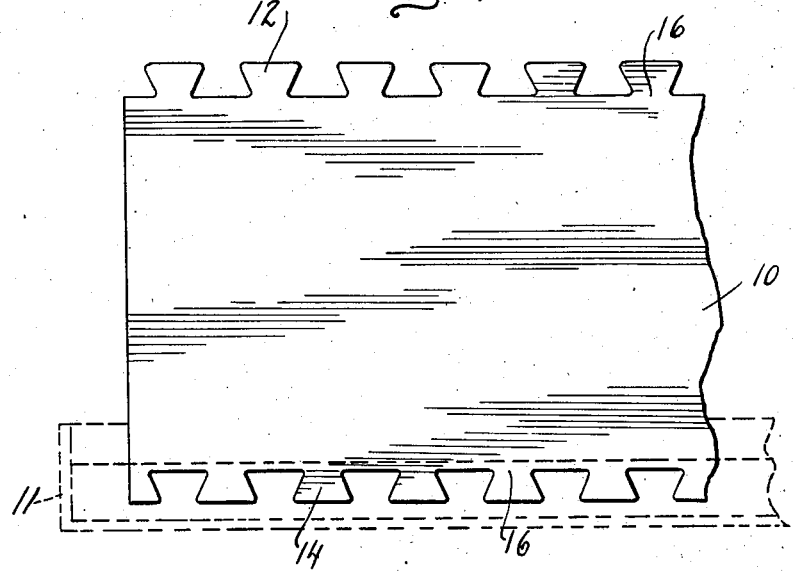
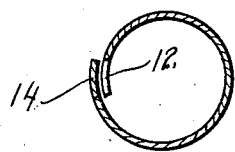
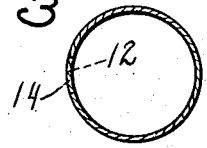
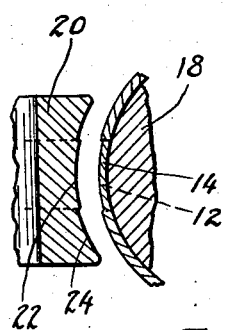
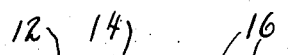
INVENTOR.
Patrick J. McIntyre
BY
ATTORNEYS.

Patented Apr. 30, 1935

1,999,818

UNITED STATES PATENT OFFICE 1,999,818

METHOD OF FORMING TUBING

Patrick J. McIntyre, Detroit, Mich.

Application January 22, 1931, Serial No. 510,496

5 Claims. (Cl. 29—156)

My invention relates to tube construction and has particular reference to an improved non-welded tube provided with a seam, but permitting smooth interior and exterior walls.

Hitherto in the construction of seamed tubing, which has not gone through the expensive process of butt welding, it has been customary to crimp the meeting edges of the rolled sheet and subsequently solder the seam so formed. This structure possessed the inherent disadvantage of having a protuberance extending along the length of the tube. A corresponding groove or rupture was formed along the interior wall of the tube corresponding thereto and as a result it was impossible to thread the interior or exterior walls of the tube. This was a serious disadvantage in that it was necessary to provide bushings and extra parts for the purpose of permitting tight joints between various lengths of tube.

I propose to overcome this difficulty by an improved method of forming tubing, the resulting product having a perfectly smooth interior and exterior wall which may be readily threaded. The improved method, broadly, consists of forming interengaging configurations along opposite edges of sheet material and subsequently rolling the sheet, whereupon the interengaging portions come together in interlocking relation, and subsequently soldering the line of joinder.

An important feature of my invention resides in the particular manner in which I form the metal strips into tubing whereby the strength of the line of joinder is materially increased over the structures hitherto utilized. I propose to add an additional modicum of pressure along the line of joinder during the forming or rolling operation whereby the metal of the interengaging edge portions will be flatted out to a certain extent, thus forcing the edges of the metal into extremely close contact along their entire length. In carrying out this forming procedure I contemplate first applying solder to the edges of the interengaging configurations and when the additional modicum of pressure is applied the expansion of the configurations will produce a substantially sealed line of joinder. The solder will be squeezed between the adjoining edges of the two to such an extent that it will impregnate the pores of the metal and form an unusually strong joint.

By providing such an interlocking seam the strength of the tube will not be entirely dependent upon the soldering material customarily used in securing the crimped over line of joinder hitherto utilized. At the same time the cost of production is materially decreased by reason of the fact that fewer operations are necessary and the resulting tubing, while possessing all the advantages of a butt welded tube, is less expensive to manufacture.

This type of tube may be utilized in any way that tubing has hitherto been used. It may be constructed of plain metal and subsequently annealed. It may be drawn to any desired shape, or to fancy design required for decorative work. It may be constructed of plain metal and coated on the outside with soft solder or it may be tin coated inside and outside in the manner necessary where tubing is to be utilized for soda fountain work, milk cooling, etc.

Various other objects and meritorious features of my invention will be apparent from the following description taken in conjunction with the the drawing wherein like numerals refer to like parts throughout the several figures and wherein:

Fig. 1 illustrates in plan view the flat strip ready for rolling into tubular formation, Fig. 2 illustrates in section the first step in the rolling operation, Fig. 3 is a section of the completed tubing, Fig. 4 is a side elevation of the completed tubing, and Fig. 5 is an enlarged fragmentary view of Fig. 3, showing the outer roll in inoperative position after performing its operation.

For purposes of illustration I have shown a small section of strip material 10 having its edges formed with a series of dove-tailed projections 12 and 14 which are adapted to interengage. While it will be apparent that this strip may be produced in any desired manner I contemplate, for purposes of volume production, pouring the molten material directly into a strip mold which is adapted to be passed slowly under an opening in the melting furnace. The width and thickness of the initial raw strip may be determined roughly by the size of the opening in the furnace and the speed with which the mold is passed thereunder. The mold may be subsequently passed through a non-oxidizing cooling chamber wherein it may be cooled by hot water.

The strip so formed may subsequently be cold rolled to secure the desired thickness and then run through slitting rolls to obtain any desired width. If desired the strips may, of course, be subjected to an annealing process to secure any desired hardness.

Various means of producing the interengaging edge formation may be utilized, but I contemplate passing the strip, formed as above described, through a punch press or die rolls for this purpose.

Having formed the strip, as illustrated in Fig. 1, it may be passed through an acid bath for cleaning purposes and subsequently run through a solder tank, or chamber, containing any desired low melting alloy. One method of soldering is shown in dotted lines in Fig. 1 wherein the interengaging edge formation of the strip 10 is dipped into solder in the container 11. The strip is then ready to be formed into tubing as indicated in Figs. 2, 3, 4, and 5.

It will be apparent from the drawing that the forming of the tubing, having produced a strip including whatever physical characteristics are necessary for the purpose to which the tubing is to be applied, is a very simple operation. The strip is simply rolled into the position indicated in Fig. 2 wherein interengaging edge portions 12 and 14 are in alinement and lying in adjacent parallel planes and the said interengaging portions are subsequently forced together into the interlocking relation clearly illustrated in Figs. 3 and 4. This may be done on forming rolls and plugs in a minimum of time and is a far less complicated operation than that required to crimp the line of joinder in the ordinary seamed tubing.

In carrying out this forming operation I propose to utilize any desired means for applying to the interlocking configurations, which form the line of joinder, an additional amount of pressure. In Fig. 5 I have illustrated one simple method of doing this. The strip 10 is rolled about the fixed arbor or spindle 18 by means of rollers such as indicated at 20 having their axis of rotation at an angle of 90° to the axis of the tubing. The rolls are provided with a projecting surface 22 which is adapted to contact the interengaging configurations as they come together in the position illustrated in Fig. 3. Assuming that a given normal pressure is exerted by the exterior roll 20, it is apparent that an additional modicum of force will be applied to the tube along the line of joinder formed by the interengaging configurations. The result will be that the metal in the interlocking portions 12 and 14 will be very slightly thinned and the reaction to this application of additional force will be to spread the metal of which the configurations are composed in all directions to form a substantially completely sealed joint. As hitherto stated, the strip 10 is soft soldered or tinned prior to the rolling operation, including the edges of the strip, and the additional pressure and consequent expansion of the interlocked portions will force the solder up into the pores of the metal to produce greater strength in the joint than has hitherto been available.

It should be noted that the portions 16 of the dove tailed elements 12 and 14 are of substantially greater length than the thickness of the material utilized. While I have illustrated the use of dove tailed portions adapted to interengage to interlock the edges of the strip in tube formation, various other interengaging configurations may readily be utilized and, with any such configuration, the smallest dimension should always be greater than the thickness of the material. This will insure a factor of safety against possible rupture of the line of joinder, the tubing being able to withstand any pressure which the walls of the tubing can withstand and allowing a substantial overload.

It will be noted that, regardless of the pressure within the tube, there will be no tendency to rupture the line of joinder because of the fact that, the pressure being exerted in all directions, there will be a tendency to interlock the configurations more firmly by virtue of the tangential tension at the same time that the transverse pressure is tending to create a rupture along and across the line of joinder.

While I have described one method of manufacture of the tubing illustrated, it will be apparent that the gist of the invention resides in the particular formation of the strips of material and the subsequent rolling of the interengaging portions into interlocking relation. However, by utilizing the general method of manufacture outlined herein great economy may be had by reason of the fact that waste ends resulting from the cutting of the tubing into desired lengths, as well as all available scrap material incident to the finished product, may be again utilized immediately by simply dumping them into the melting furnace from which the initial rough strip is poured.

Having illustrated a particular type of configuration which may be utilized in forming my improved tube, as well as one particular method for forming the same, I intend to be limited only within the scope of the appended claims.

What I claim:

1. The method of forming tubing which comprises the shaping of opposed edges of a strip into interengaging portions, applying solder to the edges of the strip, rolling the edges into interlocking engagement, and applying pressure to the interlocked edge portions thereby reducing the thickness of the tube wall along the interlocked seam and expanding the interlocked portion into close fitting engagement.

2. That step in the formation of tubing rolled from strips having opposed projections and recesses adapted to interengage which comprises the application of radially directed pressure, to the interlocked seam only, after the tube is rolled whereby the metal of the interengaging portions is spread and thinned.

3. The method of uniting two edges of sheet metal which comprises shaping the edges of the sheets into cooperating serrated edges, bringing the serrated edges together into an interengaging position to form a connecting seam, and directing pressure substantially vertical to the surfaces of the serrated edges along the seam to spread and thin the serrated edges into intimate contact.

4. The method of forming tubing which comprises the shaping of opposed edges of a strip into interengaging portions, rolling the strip into substantially tubular form, forcing the interengaging portions into interlocking engagement by pressure exerted radially of the tube, and reducing the thickness of said interengaging portions and spreading the metal of these portions into intimate contact by exerting further radial pressure upon said interengaging portions.

5. The method of forming tubing which comprises the shaping of opposed edges of a strip into interengaging portions, tinning the edges of the interengaging portions, rolling the strip into substantially tubular form, forcing the interengaging portions into interlocking engagement by pressure exerted radially of the tube, and exerting pressure after interlocking engagement upon the interlocked portions to thin the metal along the line of interengagement and cause the metal along the seam formed by the interengaging portions to spread thereabout, said last mentioned step forcing the solder into the pores in the edges of the interengaging portions.

PATRICK J. McINTYRE.